Patented Jan. 2, 1951

2,536,977

UNITED STATES PATENT OFFICE 2,536,977

METHOD OF PREPARING SUBSTITUTED THIOACETAMIDES

Henry G. Derbyshire, Johnson City, N. Y., assignor to General Aniline & Film Corporation, New York, N. Y., a corporation of Delaware No Drawing. Application December 16, 1949, Serial No. 133,471

5 Claims. (Cl. 260—240.8)

This invention relates to a method of preparing substituted thioacetamides which are of value as dyestuff intermediates.

The object of the present invention is to provide a process of manufacturing substituted thioacetamides as dyestuff intermediates for the synthesis of cyanine dyes capable of sensitizing gelatino silver halide emulsions.

Other objects and advantages of this invention will be apparent by reference to the following specification in which its preferred details and embodiments are described.

These and other objects are accomplished by heating the cyclammonium quaternary salt having a reactive methyl group in α- or γ-position to the quaternary nitrogen atom with an alkyl N-phenyldithiocarbamate in the presence of a basic condensing agent. The reaction takes place with the liberation of an alkyl mercaptan and yields the thioacetamide derivative. The resulting products may be (1) alkylated with an alkyl or aralkyl ester, or (2) heated with an α-halogen acetic acid, α-dihalogen acetic acid, or with an α-halogen propionic acid to yield thiazolone cyanine dyes with a methine chain group. The product obtained from the second reaction by treatment with α-halogen acetic acid may be further treated with a cyclammonium quarternary salt of the type commonly employed in cyanine dye synthesis to yield trinuclear cyanine dyes.

The reaction involved while utilizing a cyclammonium quaternary salt and an alkyl N-phenyldithiocarbamate in the presence of a basic condensing agent is illustrated by the following equation:

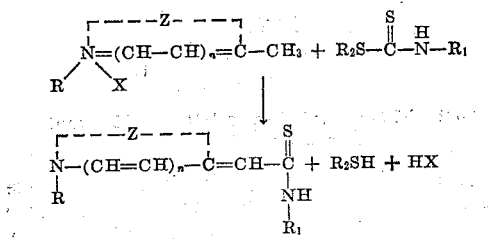

In the foregoing equation R represents an alkyl, aryl, aralkyl or substituted groups of this type, e. g., methyl, ethyl, propyl, butyl, hydroxymethyl, hydroxyethyl, hydroxypropyl, hydroxybutyl, ethoxyethyl, ethoxymethyl, ethoxypropyl, ethoxybutyl, phenyl, tolyl, naphthyl, benzyl, phenethyl, menaphthyl, and the like, $R_1$ represents a phenyl or substituted phenyl group, such as phenyl, tolyl, ethoxy phenyl, chlorophenyl, p-dimethylaminophenyl and the like, $R_2$ represents an alkyl group of not more than four carbon atoms, e. g., methyl, ethyl, propyl, isopropyl, N-butyl, and the like, $n$ represents 0 or 1, X represents an acid radical, e. g., chloride, bromide, iodide, or alkyl sulfate, alkyl p-toluenesulfonate or perchlorate, and Z represents the residue of a heterocyclic nitrogenous nucleus of the type used in cyanine dyes, e. g., oxazoles, thiazoles, selenazoles, and their polycyclic homologues, such as those of the benzene, nathalene, acenaphthene, and anthracene series, pyridine, and its polycyclic homologues, such as quinoline and α- and β-naphthaquinolines, perinaphthiazoles indolenines, diazines, such as pyrimidines, and quinazolines, diazoles (e. g., thio-β-β'-diazole), oxazolines, pyrrolines, thiazolines and selenazolines (the polycyclic compounds of these series being substituted if desired in the carbocyclic rings with one or more conventional groups, such as alkyl or aryl, as below, amino, hydroxy, alkoxy, i. e., methoxy, ethoxy, etc., and methylenedioxy groups, or by halogen atoms, i. e., chlorine, bromine, etc.).

Any one of the known types of cyclammonium quaternary salts having the specific reactive methyl group commonly employed for use in the manufacture of cyanine dyes may be employed in the process of the present invention. As representative examples of such salts the following may be mentioned:

2-methylpyridine ethiodide
2-methylquinoline ethiodide
2-methylthiazoline methiodide
2-methylbenzothiazole ethiodide
2-methylbenzoselenazole methiodide
2-methylbenzoxazole methiodide
2-methylnaphthothiazole methiodide
2-methylnaphthoselenazole ethiodide
2-methylnaphthoxazole methiodide
2-methyl-5, 6 - cyclopentylidine-dioxy-benzthiazole ethyl p-toluene-sulfonate
2-methyl-6, 7-benzobenzthiazole ethyl p-toluenesulfonate
2-methyl-5, 6-dimethoxy-benzthiazole ethyl p-toluenesulfonate The following are examples of suitable alkyl N-phenyldithiocarbamates which may be condensed with the cyclammonium quaternary salts in the presence of a basic condensing agent:

Methyl N-phenyldithiocarbamate
Ethyl N-phenyldithiocarbamate
Propyl N-phenyldithiocarbamate
Isopropyl N-phenylithiocarbamate
Butyl N-phenyldithiocarbamate
Methyl N-(p-tolyl) dithiocarbamate
Ethyl N-(p-tolyl) dithiocarbamate
Methyl N-(p-methoxyphenyl) dithiocarbamate
Ethyl N-(p-ethoxyphenyl) dithiocarbamate
Ethyl N-(p-diethylaminophenyl) dithiocarbamate The substituted thioacetamides are prepared by dissolving a molecular equivalent of a cyclammonium quaternary salt having the specified reactive methyl group, and a slight excess of a molecular equivalent of an alkyl N-phenyldithiocarbamate in a sufficient quantity of a heterocyclic nitrogenous base, such as pyridine, dimethylpyridine, ethylpyridine, ethylmethylpyridine, trimethylpyridine, quinoline, and the like. To this solution a small quantity of an organic base, such as an alkylamine, e. g., dimethylamine, diethylamine, trimethylamine, triethylamine, and the like, is added and the solution is heated either at the steam bath or reflux temperature for a period of time ranging from 15 minutes to 1 hour. The crystals which form during this time are filtered off, washed with alcohol, and dried.

The reaction product obtained may be alkylated by heating a molecular equivalent of the product with about 1 to 4 molecular equivalents of an alkyl or aralkyl ester usually employed in the cyanine dye art, such as, for example, dimethyl or diethyl sulfate, benzyl iodide, methyl p-toluenesulfonate, and the like, in a closed vessel at a temperature ranging from 120–160° C. from 2 to 6 hours. The reaction mixture is cooled, boiled with acetone, alcohol added, and the crystals precipitated with ether. The final product is purified by precipitation with ether from a methanol-acetone solution.

The following examples describe the preparation of some of the substituted thioacetamides. It is to be understood that they are merely illustrative and that the invention is not to be regarded as restrictive thereto.

*Example I*

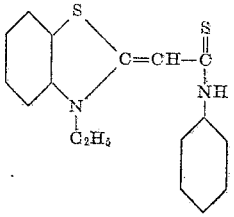

α-(3-ethyl-2-benzothiazolylidene)-N-phenyl thioacetamide 15 grams of 2-methylbenzothiazole ethiodide and 9 grams of methyl N-phenyldithiocarbamate were dissolved in 60 mls. of hot pyridine and the solution heated for 30 minutes on a hot plate until its temperature rose from 80° to 115° C. During this period, methylmercaptan was given off and the solution took on a deep orange red color. The pyridine solution was cooled to 50° C. and poured into 700 mls. of water. A red oil was separated and triturated with 50 mls. of methanol. After several minutes, the oil turned into a solid product which was filtered off, washed with isopropyl alcohol, and dried at 80° C. The product obtained melted at 179–181° C.

*Example II*

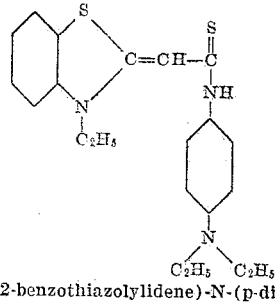

α-(3-ethyl-2-benzothiazolylidene)-N-(p-diethylaminophenyl)-thioacetamide 15 grams of 2-methylbenzothiazole ethyl p-toluenesulfonate and 10 grams of methyl N-(p-diethylaminophenyl)dithiocarbamate were dissolved in 40 mls. of pyridine and 10 mls. of triethylamine. The resulting solution was heated slowly for 45 minutes until its internal temperature had risen to 120° C. After cooling to 25° C., 50 grams of ice were stirred into the pyridine reaction mixture, whereupon an orange-red solid precipitated. The solid was filtered off, washed with water, and then boiled out with methanol.

The solid product was filtered off, washed with two ml. portions of methanol, and dried. 7 grams of a yellow solid were obtained which melted at 148–151° C.

*Example III*

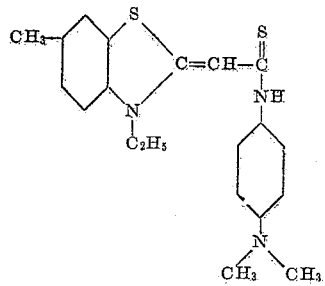

α-(3-ethyl-6-methyl-2-benzothiazolylidene)-N-(p-dimethylaminophenyl)thioacetamide 3.2 grams of 2,6-dimethylbenzothiazole ethiodide and 2.26 grams of methyl N-(p-dimethylaminophenyl)dithiocarbamate were boiled together in 10 mls. of pyridine and 3 mls. of triethylamine until no more methylmercaptan was given off. The reddish mixture was poured into 300 mls. of water and stirred vigorously. The water layer was decanted and the remaining oil triturated with 50 mls. of methanol. The yellow crystalline solid was washed with methanol, boiled out with isopropyl alcohol and dried. The final product melted at 159–161° C.

*Example IV*

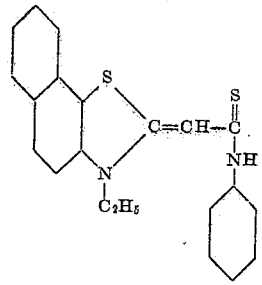

α-(3-ethyl-2-naphtho[2.1]diazolylidene)-N-phenyl thioacetamide 9.2 grams of methyl N-phenyldithiocarbamate and 17.8 grams of 2-methylnaphtho[2.1]thiazole ethiodide were dissolved in 60 mls. of pyridine. The resulting solution was boiled until the temperature had risen to 145° C. Yellow crystals separated upon cooling. For purification purposes the product was washed repeatedly with water, triturated with 20 mls. of methanol, filtered, and washed alternately with 10 ml. portions of water and methanol. 10.7 grams of a crystalline product melting at 201–204° C. were obtained after drying.

The dyestuff intermediates prepared according to the preceding examples may be utilized in the synthesis of various types of sensitizing dyes, such as carbocyanine dyes, chain substituted carbocyanine dyes, trinuclear cyanine dyes, merocyanine dyes and the like.

I claim:
1. A process for the preparation of a substituted thioacetamide dyestuff intermediate characterized by the following general formula:

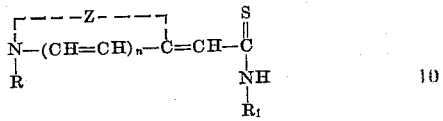

wherein R represents a member selected from the class consisting of alkyl, aryl, and aralkyl groups, $R_1$ represents a member selected from the class of phenyl and substituted phenyl, $n$ represents an integer of from 0 to 1, and Z represents the atoms necessary to complete a heterocyclic nitrogenous ring system, which comprises heating in the presence of a basic condensing agent a cyclammonium quaternary salt containing a reactive methyl group in one of the positions selected from the group consisting of the α- and γ-position to the nitrogen atom thereof with an alkyl N-phenyldithiocarbamate in which the alkyl group consists of not more than 4 carbon atoms.

2. A process for the preparation of substituted thioacetamide dyestuff intermediates characterized by the following formula:

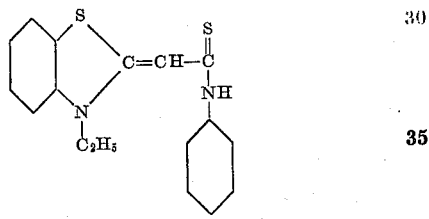

which comprises heating in the presence of a basic condensing agent 2-methylbenzothiazole ethiodide with methyl N-phenyldithiocarbamate.

3. A process for the preparation of a substituted thioacetamide intermediate characterized by the following formula:

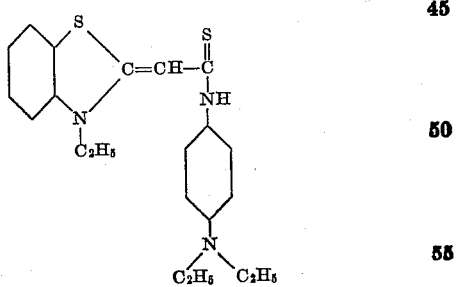

which comprises reacting in the presence of a basic condensing agent 2-methylbenzothiazole ethyl p-toluenesulfonate and methyl N-(p-diethylaminophenyl)dithiocarbamate.

4. A process for the preparation of a substituted thioacetamide characterized by the following general formula:

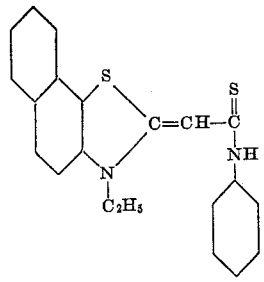

which comprises reacting in the presence of a basic condensing agent 2 - methylnaphtho[2.1] thiazole ethiodide with methyl N-phenyldithiocarbamate.

5. A process for the preparation of a substituted thioacetamide characterized by the following general formula:

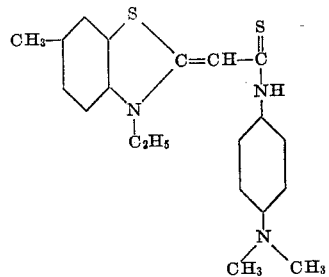

which comprises reacting in the presence of a basic condensing agent 2,6-dimethylbenzothiazole ethiodide with N-(p-dimethylaminophenyl)dithiocarbamate.

HENRY G. DERBYSHIRE.

No references cited.